United States Patent
Aoki et al.

(10) Patent No.: US 12,503,618 B2
(45) Date of Patent: Dec. 23, 2025

(54) PHOTOCURABLE INKJET PRINTING INK COMPOSITION

(71) Applicant: SAKATA INX CORPORATION, Osaka (JP)

(72) Inventors: Yoshiyuki Aoki, Osaka (JP); Okinori Nakashima, Osaka (JP); Kazuhiro Fuke, Osaka (JP)

(73) Assignee: SAKATA INX CORPORATION, Osaka (JP)

(*) Notice: Subject to any disclaimer, the term of this patent is extended or adjusted under 35 U.S.C. 154(b) by 544 days.

(21) Appl. No.: 17/998,249

(22) PCT Filed: Apr. 30, 2021

(86) PCT No.: PCT/JP2021/017148
§ 371 (c)(1),
(2) Date: Nov. 8, 2022

(87) PCT Pub. No.: WO2021/235215
PCT Pub. Date: Nov. 25, 2021

(65) Prior Publication Data
US 2023/0220225 A1 Jul. 13, 2023

(30) Foreign Application Priority Data
May 20, 2020 (JP) ................ 2020-088008

(51) Int. Cl.
C08F 2/46 (2006.01)
C08G 61/04 (2006.01)
C09D 11/101 (2014.01)
C09D 11/107 (2014.01)
C09D 11/38 (2014.01)

(52) U.S. Cl.
CPC ............ C09D 11/38 (2013.01); C09D 11/101 (2013.01); C09D 11/107 (2013.01)

(58) Field of Classification Search
CPC ..... C09D 11/101; C09D 11/322; C09D 11/38; C09D 11/107
USPC ....... 522/103, 100, 1, 6, 189, 184, 71; 520/1
See application file for complete search history.

(56) References Cited

U.S. PATENT DOCUMENTS

| | | | |
|---|---|---|---|
| 2006/0054040 A1* | 3/2006 | Daems ............... | B41C 1/003 101/463.1 |
| 2008/0038570 A1 | 2/2008 | Satou et al. | |
| 2015/0017398 A1 | 1/2015 | Saito et al. | |
| 2016/0185987 A1 | 6/2016 | Saito et al. | |
| 2019/0062580 A1 | 2/2019 | Nakashima et al. | |
| 2019/0233634 A1 | 8/2019 | Ota et al. | |
| 2021/0214568 A1 | 7/2021 | Konda et al. | |

FOREIGN PATENT DOCUMENTS

| | | | |
|---|---|---|---|
| CN | 104066803 A | 9/2014 | |
| CN | 105339167 A | 2/2016 | |
| CN | 109715370 A | 5/2019 | |
| CN | 108699367 B | 9/2022 | |
| EP | 3608373 A1 | 2/2020 | |
| EP | 3608373 B1 * | 10/2021 | ........... C14C 11/003 |
| GB | 2561984 A | 10/2018 | |
| JP | 2007131755 A | 5/2007 | |
| JP | 2008063556 A | 3/2008 | |
| JP | 2009035650 A | 2/2009 | |
| JP | 2013142151 A | 7/2013 | |
| JP | 2014234401 A | 12/2014 | |
| JP | 2017019939 A | 1/2017 | |
| JP | 2017149825 A | 8/2017 | |
| JP | 6649549 B1 | 2/2020 | |

OTHER PUBLICATIONS

International Preliminary Report on Patentability, dated Nov. 17, 2022, for corresponding international application PCT/JP2021/017148 (1 page).
Notification Concerning Transmittal of International Preliminary Report on Patentability, mailed Dec. 1, 2022, for corresponding international application PCT/JP2021/017148 (1 page).
Notification of Transmittal of Translation of the International Preliminary Report on Patentability, mailed Dec. 1, 2022, for corresponding international application PCT/JP2021/017148 (1 page).
Written Opinion of the International Searching Authority, mailed Jul. 27, 2021, for corresponding international application PCT/JP2021/017148 (4 pages).
Extended European Search Report (EESR) dated Apr. 19, 2024, issued for European counterpart patent application No. EP21809233.6 (6 pages).

(Continued)

*Primary Examiner* — Jessica Whiteley
(74) *Attorney, Agent, or Firm* — Law Office of Katsuhiro Arai

(57) ABSTRACT

An object is to improve all of the following with respect to a photocurable inkjet printing ink composition: discharge stability during printing, as well as tackiness, base material adhesion, bending resistance, abrasion resistance, and solvent resistance of cured coating film. As a solution, a photocurable inkjet printing ink composition is provided that contains a colorant, photopolymerizable components, and photopolymerization initiator, and satisfies all of conditions (1) to (3) below.

(1) an ethylene oxide-modified bifunctional monomer is contained by 5.0 to 40.0% by mass, and monofunctional monomers are contained by 60.0% by mass or more, relative to all photopolymerizable components (2) the theoretical Tg of the ethylene oxide-modified bifunctional monomer is 20° C. or lower (3) the theoretical Tg of a copolymer of solely the monofunctional monomers is 20 to 40° C.

4 Claims, No Drawings

(56) References Cited

OTHER PUBLICATIONS

International Search Report (ISR) mailed Jul. 27, 2021, issued for International application No. PCT/JP2021/017148. (3 pages).
A First Office Action issued by the State Intellectual Property Office of China on Mar. 29, 2023, for Chinese counterpart application No. 202180034004.X (7 pages).

* cited by examiner

PHOTOCURABLE INKJET PRINTING INK COMPOSITION

CROSS-REFERENCE TO RELATED APPLICATIONS

This application is the U.S. National Phase under 35 U.S.C. § 371 of International Application PCT/JP2021/017148, filed Apr. 30, 2021, which claims priority to Japanese Patent Application No. JP2020-088008, filed May 20, 2020. The International Application was published under PCT Article 21 (2) in a language other than English.

TECHNICAL FIELD

The present invention relates to a photocurable inkjet printing ink composition.

BACKGROUND ART

So that coating films obtained by UV-curable inkjet inks will have both high flexibility and coating resistance (abrasion resistance, ethanol resistance), a method of using low-Tg monofunctional monomers in their chief compositional makeup of monomers is available. However, many low-Tg monomers are highly-volatile low-molecular compounds that produce odor, while negatively affecting coating resistance and various other physical properties as well as tackiness of coating films in particular, thereby making these properties difficult to achieve, together with flexibility of coating film. On the other hand, using large amounts of polyfunctional monomers or high-Tg monomers for the purpose of solving tackiness (reducing tackiness) leads to lower base material adhesion and flexibility.

In addition, while the inkjet ink described in Patent Literature 1 is used in applications where workability of coating film is required, it is not intended for forming coating films that also offer abrasion resistance and solvent resistance.

The ink composition described in Patent Literature 2 was found unusable in a wider range of applications as it does not consider solvent resistance.

The active energy ray-curable composition described in Patent Literature 3 contains a polyfunctional polymerizable compound of 40° C. or higher Tg. As a result, while this composition can achieve a coating film offering excellent abrasion resistance and stretchability, it is not intended for improving other properties.

BACKGROUND ART LITERATURE

Patent Literature

Patent Literature 1: Japanese Patent Laid-open No. 2007-131755
Patent Literature 2: Japanese Patent Laid-open No. 2013-142151
Patent Literature 3: Japanese Patent Laid-open No. 2017-019939

SUMMARY OF THE INVENTION

Problems to be Solved by the Invention

An object of the present invention is to improve all of the following with respect to a photocurable inkjet printing ink composition: discharge stability during printing, as well as tackiness (suppression of tackiness), base material adhesion, bending tolerance property, abrasion resistance, and solvent resistance of cured coating film.

Means for Solving the Problems

As a result of studying in earnest to achieve the aforementioned object, the inventors of the present invention completed the present invention below:

1. A photocurable inkjet printing ink composition that contains a colorant, photopolymerizable components, and photopolymerization initiator, and satisfies all of conditions (1) to (3) below.
   (1) an ethylene oxide-modified bifunctional monomer is contained by 5.0 to 40.0% by mass, and monofunctional monomers are contained by 60.0% by mass or more, relative to all photopolymerizable components
   (2) the theoretical Tg of the ethylene oxide-modified bifunctional monomer is 20° C. or lower
   (3) the theoretical Tg of a copolymer of solely the monofunctional monomers is 20 to 40° C.
2. The photocurable inkjet printing ink composition according to 1, wherein the content of ethylene oxide-modified bifunctional monomer is 10.0 to 30.0% by mass relative to all photopolymerizable components.
3. The photocurable inkjet printing ink composition according to 1 or 2, wherein the ethylene oxide-modified bifunctional monomer contains at least one of polyethylene glycol (200) diacrylate, polyethylene glycol (400) diacrylate, ethoxylated (10) bisphenol A diacrylate, and EO-modified 1,6-hexanediol diacrylate.
4. The photocurable inkjet printing ink composition according to any one of 1 to 3, which contains amine-modified oligomers.

Effects of the Invention

According to the present invention, an effect of forming a coating film offering excellent discharge stability as well as excellent tackiness, base material adhesion, bending tolerance property, abrasion resistance, and solvent resistance is demonstrated.

Under the present invention, tackiness, flexibility, and resistance of coating film can be achieved in a well-balanced manner by selecting low-Tg bifunctional monomers to be used by an appropriate amount.

MODE FOR CARRYING OUT THE INVENTION

The photocurable inkjet printing ink composition proposed by the present invention is described below in order.
<Colorant>
A colorant for each hue may be added to the photocurable inkjet printing ink composition proposed by the present invention, to obtain a photocurable inkjet printing ink composition of each color.

For such colorant, any pigment or dye traditionally used in standard photocurable inkjet printing ink compositions may be used without limitation; when lightfastness is considered, however, pigments such as organic pigments and inorganic pigments are preferred.

Organic pigments include, for example, dye rake pigments as well as azo-based, benzimidazolone-based, phthalocyanine-based, quinacridone-based, anthraquinone-based, dioxazine-based, indigo-based, thioindigo-based, perylene-based, perinone-based, diketopyrrolopyrrole-based, isoindolinone-based, nitro-based, nitroso-based, flavanthronebased, quinophthalone-based, pyranthrone-based, indanthrone-based and other pigments, and the like. Inorganic pigments include carbon black, titanium oxide, red iron oxide, graphite, iron black, chrome oxide green, aluminum hydroxide, etc.

Also, specific examples of pigments for the photocurable inkjet printing ink composition proposed by the present invention are listed below by each representative hue.

First, yellow pigments to be used as a yellow photocurable inkjet printing ink composition include, for example, C. I. Pigment Yellow 1, 2, 3, 12, 13, 14, 16, 17, 42, 73, 74, 75, 81, 83, 87, 93, 95, 97, 98, 108, 109, 114, 120, 128, 129, 138, 139, 150, 151, 155, 166, 180, 184, 185, 213, etc., or preferably C. I. Pigment Yellow 150, 155, 180, 213, etc.

Magenta pigments to be used as a magenta photocurable inkjet printing ink composition include, for example, C. I. Pigment Red 5, 7, 12, 22, 38, 48:1, 48:2, 48:4, 49:1, 53:1, 57, 57:1, 63:1, 101, 102, 112, 122, 123, 144, 146, 149, 168, 177, 178, 179, 180, 184, 185, 190, 202, 209, 224, 242, 254, 255, 270, C. I. Pigment Violet 19, etc., or preferably C. I. Pigment Red 122, 202, C. I. Pigment Violet 19, etc.

Cyan pigments to be used as a cyan photocurable inkjet printing ink composition include, for example, C. I. Pigment Blue 1, 2, 3, 15, 15:1, 15:2, 15:3, 15:4, 15:6, 16, 18, 22, 27, 29, 60, etc., or preferably C. I. Pigment Blue 15:4, etc.

Black pigments to be used as a black photocurable inkjet printing ink composition include, for example, carbon black (C. I. Pigment Black 7), etc.

White pigments to be used as a white photocurable inkjet printing ink composition include, for example, titanium oxide, aluminum oxide, etc., or preferably titanium oxide that has been surface-treated with alumina, silica, or various other materials.

Preferably the content of colorant in the photocurable inkjet printing ink composition proposed by the present invention is 1.0 to 20.0% by mass relative to the total quantity of photocurable inkjet printing ink composition. If the content of colorant is lower than 1.0% by mass, the image quality of obtained printed matters tends to drop.

If the content exceeds 20% by mass, on the other hand, viscometric property of the photocurable inkjet printing ink composition tends to be negatively affected.

<Photopolymerizable Components>

Photopolymerizable components are components that each contain an ethylene oxide-modified bifunctional monomer with a specific theoretical Tg as well as monofunctional monomers that form a polymer or copolymer exhibiting a specific theoretical Tg, and may also include other photopolymerizable components.

(Definition of Tg (Glass Transition Temperature))

Under the present invention, Tg values relating to ethylene oxide-modified bifunctional monomers, monofunctional-monomer copolymers, etc., are theoretical values (theoretical Tg), each obtained by the formula below. Hereinafter any Tg, if it indicates that of a copolymer, shall be deemed a theoretical Tg (° C.).

$$1/(Tg+273)=W1/(Tg1+273)+W2/(Tg2+273)+W3/(Tg3+273)+ \ldots +Wx/(Tgx+273)$$ -Formula- (In the formula, Tg1 to Tgx indicate the glass transition temperatures of homopolymers constituted, respectively, by polymerizable monomers 1, 2, 3, . . . , x, constituting a copolymer, W1 to Wx indicate the mass fractions of monomers 1, 2, 3, . . . , x, respectively, and Tg indicates a glass transition temperature (Tg).)

(Ethylene Oxide-modified Bifunctional Monomers with Tg of 20° C. or Lower)

Under the present invention, the following may be used, for example, as the ethylene oxide-modified bifunctional monomer for satisfying condition (2). It should be noted that the numerical values in H are numbers of ethylene glycol-derived repeating units. Here, each such number of repeating units represents the number of repeating units that are contained by the largest quantity.

Preferably it contains at least one of polyethylene glycol (200) diacrylate [4], polyethylene glycol (400) diacrylate [9], polyethylene glycol (600) diacrylate [14], ethoxylated (10) bisphenol A diacrylate [10], and ethylene oxide (EO)-modified 1,6-hexanediol diacrylate.

It should be noted that the number of ethylene glycol-derived repeating units in any of the polyethylene glycol diacrylates is preferably 4 to 10, or more preferably 6 to 10.

The number of ethylene glycol-derived repeating units in the ethoxylated bisphenol A diacrylate is preferably 10 or smaller in total, while the number of ethylene oxide repeating units in the EO-modified 1,6-hexanediol diacrylate is preferably 5 or greater.

Any such ethylene oxide-modified bifunctional monomer has a Tg of preferably −35° C. or higher, or more preferably −25° C. or higher.

[Condition (1)]

The photocurable inkjet printing ink composition proposed by the present invention contains the aforementioned ethylene oxide-modified bifunctional monomer by 5.0% by mass or more relative to all photopolymerizable components, where the content is preferably 8.0% by mass or higher, or more preferably 12.0% by mass or higher. At the same time, it is contained by no more than 40.0% by mass, where the content is preferably 35.0% by mass or lower, or more preferably 30.0% by mass or lower.

Furthermore, the content of the aforementioned monofunctional monomers is 60.0% by mass or higher, or preferably 70.0% by mass or higher, or more preferably 75.0% by mass or higher, while it is preferably 90.0% by mass or lower, or more preferably 85.0% by mass or lower.

If the content of ethylene oxide-modified bifunctional monomer is insufficient, the coating film tends to have poor bending tolerance property, abrasion resistance, and solvent resistance.

If the content of ethylene oxide-modified bifunctional monomer is excessive, or the content of monofunctional monomers is insufficient, poor base material adhesion and bending tolerance property tend to result.

[Condition (2)]

With the photocurable inkjet printing ink composition proposed by the present invention, the Tg of the ethylene oxide-modified bifunctional monomer must be 20° C. or lower. Furthermore, it is preferably 5° C. or lower, or more preferably −5° C. or lower, or yet more preferably −15° C. or lower. If the Tg exceeds 20° C., the coating film tends to have poor tackiness and base material adhesion.

(Monofunctional Monomers Whose Copolymer Will Have Theoretical Tg of 20 to 40° C.)

Under the present invention, the following may be used, for example, as the monomers for obtaining a copolymer that satisfies condition (3):

Butyl meth(acrylate), isobutyl (meth)acrylate, tertiary butyl (meth)acrylate, octyl (meth)acrylate, 2-ethylhexyl (meth)acrylate, decyl (meth)acrylate, isomyristyl (meth)acrylate, stearyl (meth)acrylate, isostearyl (meth)acrylate, lauryl (meth)acrylate, and other alkyl (meth)acrylates, isobornyl (meth)acrylate, cyclic trimethylolpropane formal (meth)acrylate, cyclohexyl (meth)acrylate, butylcyclohexyl acrylate, trimethylcyclohexyl acrylate, adamantyl (meth)acrylate, dicyclopentanyl (meth)acrylate, dicyclopentenyl (meth)acrylate, and other acrylates, styrene, benzyl (meth)acrylate, 2-phenoxyethyl (meth)acrylate, ethylene oxide-modified products thereof, and other (meth)acrylates having aliphatic rings and (meth)acrylates having aromatic rings, ethyl carbitol (meth)acrylate, 2-methoxyethyl acrylate, polyethylene glycol (meth)acrylate, isoamyl (meth)acrylate, hydroxymethyl (meth)acrylate, hydroxyethyl (meth)acrylate, hydroxypropyl (meth)acrylate, hydroxybutyl (meth)acrylate, hydroxyphenoxypropyl (meth)acrylate, 2-ethylhexyl-diglycol (meth)acrylate, 2-acryloyloxyethyl hexahydrophthalate, butoxyethyl acrylate, ethoxydiethylene glycol (meth)acrylate, ethyl carbitol acrylate, methoxydiethylene glycol (meth)acrylate, methoxypolyethylene glycol (meth)acrylate, methoxypropylene glycol (meth)acrylate, tetrahydrofurfuryl (meth)acrylate, (2-methyl-2-ethyl-1,3-dioxolane-4-yl)methyl (meth)acrylate, (3-ethyloxetane-3-yl)methyl methacrylate, phenol ethylene glycol-modified acrylate, 2-hydroxypropyl (meth)acrylate, 2-hydroxy-3-phenoxypropyl (meth)acrylate, 2-acryloyloxyethyl succinate, 2-acryloyloxyethyl phthalate, 2-acryloyloxyethyl-2-hydroxethyl-phthalate, lactone-modified flexible acrylate, t-butylcyclohexyl (meth)acrylate, vinyloxyethoxyethyl (meth)acrylate, 2-(2-ethoxyethoxy)ethyl (meth)acrylate, and other (meth)acrylates containing hydroxyl groups and (meth)acrylates containing ether groups.

Acrylamide, acryloylmorpholine, and various other types of (meth)acrylamide-based monomers, N-vinylcaprolactam, N-vinyl-5-methyloxazolidinone, and other N-vinylamide-based monomers, etc., may also be used.

[Condition (3)]

Under the present invention, the theoretical Tg of a copolymer of the aforementioned monofunctional monomers, as obtained by the aforementioned calculation formula, is in a range of 20 to 40° C. Here, it is not necessary for all monofunctional monomers to have a theoretical Tg of 20 to 40° C.; instead, it suffices that the theoretical Tg achieved by copolymerizing the multiple types of monofunctional monomers is 20 to 40° C. Accordingly, it is not necessary for some or all of the monofunctional monomers to have a theoretical Tg of 20 to 40° C.

However, the theoretical Tg of the copolymer of the aforementioned monofunctional monomers is preferably 25° C. or higher, or more preferably 35° C. or lower. If the theoretical Tg is lower than 20° C., tackiness and solvent resistance tend to become poor, while a theoretical Tg exceeding 40° C. tends to result in poor base material adhesion and bending tolerance property.

Subject to condition (3) being satisfied, the total content of monofunctional monomers in all photopolymerizable components is preferably 60.0% by mass or higher, or more preferably 65.0% by mass or higher, or yet more preferably 70.0% by mass or higher, or most preferably 80.0% by mass or higher. If the content of monofunctional monomers is lower than 60.0% by mass, higher viscosity as well as lower base material adhesion and bending tolerance property tend to result.

(Polyfunctional Monomers not Ethylene Oxide-Modified)

As monomers not listed above, the following polyfunctional monomers that are not ethylene oxide-modified may be used, but they do not have to be contained. If contained, they may be contained to the extent that the effects of the present invention are not impaired:

Propylene glycol di(meth)acrylate, butanediol di(meth)acrylate, hexanediol di(meth)acrylate, dipropylene glycol di(meth)acrylate, tripropylene glycol di(meth)acrylate, and other (poly)alkylene glycol di(meth)acrylates, 1,9-nonanediol di(meth)acrylate, neopentyl glycol di(meth)acrylate, dimethylol-tricyclodecane di(meth)acrylate, hydroxypivalate neopentyl glycol di(meth)acrylate, polytetramethylene glycol diacrylate, trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, urethane (meth)acrylate, epoxy (meth)acrylate, polyester (meth)acrylate, pentaerythritol ethoxy tetra(meth)acrylate, caprolactam-modified dipentaerythritol hexa(meth)acrylate, etc.

(Ethylene Oxide-modified Monomers Having 3 or More Functions, Ethylene Oxide-modified Bifunctional Monomers with Tg Exceeding 20° C.)

Furthermore, the following polyfunctional monomers may be used as ethylene oxide-modified monomers having three or more functions or ethylene oxide-modified bifunctional monomers with a Tg exceeding 20° C., but they do not have to be contained. If contained, they may be contained to the extent that the effects of the present invention are not impaired:

Ethylene oxide-modified products of trimethylolpropane tri(meth)acrylate, ethylene oxide-modified products of pentaerythritol tri(meth)acrylate, ethylene oxide-modified products of pentaerythritol tetra(meth)acrylate, ethylene oxide-modified products of dipentaerythritol penta(meth)acrylate, ethylene oxide-modified products of dipentaerythritol hexa(meth)acrylate, etc.

Also, among polyethylene oxide-modified bisphenol A di(meth)acrylate, polyethylene oxide-modified alkylenediol di(meth)acrylate, etc., monomers with a Tg exceeding 20° C. may be used.

(Amine-modified Oligomers)

Preferably oligomers having amino groups and/or amide groups, examples of which include the following, are added to the photocurable inkjet printing ink composition proposed by the present invention.

Such oligomers may be acrylated amine compounds such as CN371, CN373, CN386, CN501, CN550, and CN551 (manufactured by Sartomer Inc.). Among these, preferably an acrylated amine compound having two photopolymerizable functional groups and two amino groups in the molecule is used in combination with acryloylmorpholine and/or N-vinylcaprolactam.

The content of oligomers having amino groups and/or amide groups may be determined as deemed appropriate. From the viewpoint of curability, however, it is preferably 2.0 to 10.0% by mass, or more preferably 3.0 to 6.0% by mass, in the photopolymerizable components. If the content is lower than 2.0% by mass, curability and tackiness may drop.

(Preferred Combination of Photopolymerizable Compounds in Present Invention)

To satisfy the aforementioned conditions, etc., and demonstrate the effects of the present invention with greater certainty, preferably the photocurable inkjet printing ink composition proposed by the present invention contains amine-modified oligomers, one or more types selected from polyethylene glycol diacrylate, ethoxylated bisphenol diacrylate, ethylene oxide-modified 1,6-hexanediol diacrylate, and other diacrylates, and one or more types selected from 2-(2-ethoxyethoxy)ethyl acrylate, 2-phenoxyethyl acrylate, isobornyl acrylate, N-vinylcaprolactam, and acryloylmorpholine.

<Photopolymerization Initiator>

For the photopolymerization initiator, diphenyl(2,4,6-trimethylbenzoyl)phosphine oxide, 2,4,6-trimethylbenzoyl-diphenyl-phospine oxide, bis(2,4,6-trimethylbenzoyl)-phenylphosphine oxide, ethyl 2,4,6-trimethylbenzoylphenylphosphinate, etc., may be used.

The content of photopolymerization initiator is preferably in a range of 3.0 to 25.0% by mass, or more preferably in a range of 5.0 to 15.0% by mass, relative to the total mass of photopolymerizable components.

By adjusting this content to the range of 3.0 to 25.0% by mass, discharge property, curability, and preservation stability of the ink composition can be maintained in a well-balanced manner.

<Photosensitizer>

In the photocurable inkjet printing ink composition proposed by the present invention, a photosensitizer (compound) that has light absorbing properties primarily in the ultraviolet ray wavelength range of 400 nm and higher, and manifests a function to sensitize the curing reaction under light having wavelengths in this range, may also be used together with the photopolymerization initiator, to promote curability under ultraviolet ray from a light-emitting diode (LED) light source.

Such photosensitizer may be an anthracene photosensitizer, thioxanthen-based photosensitizer, etc., where a thioxanthen-based photosensitizer is preferred. Any of these photosensitizers may be used alone or two or more types may be used together.

Specific examples include 9,10-dibutoxyanthracene, 9,10-diethoxyanthracene, 9,10-dipropoxyanthracene, 9,10-bis(2-ethylhexyloxy) anthracene, and other anthracene photosensitizers, as well as 2,4-diethyl thioxanthen-9-one, 2-isopropyl thioxanthen, 4-isopropyl thioxanthen and other thioxanthen-based photosensitizers. Representative examples of commercial products include DBA and DEA (manufactured by Kawasaki Kasei Chemicals Ltd.) for anthracene photosensitizers, and DETX and ITX (manufactured by Lambson Ltd.) for thioxanthen-based photosensitizers, and the like.

Preferably the content of photosensitizer is in a range of 0 to 8% by mass relative to the total mass of photopolymerizable components. A content exceeding 8% by mass is not desirable because it represents an excessive addition that no longer leads to improvement in effects.

It should be noted that, if a thioxanthen-based photosensitizer is used as the photosensitizer, the photocurable inkjet printing ink composition tends to turn yellow and take on a hue that is yellower than the color based on the pigment (inherent hue), and therefore, preferably the content of such thioxanthen-based photosensitizer is determined as deemed appropriate for each color.

To be specific, preferably white ink compositions and clear ink compositions that are more easily affected by a change in color tone do not contain any thioxanthene-based compound as the photosensitizer. Also, preferably, magenta ink compositions and cyan ink compositions that present problems if a change in hue occurs use the thioxanthen-based photosensitizer only to the extent that doing so does not cause problems with the hue. Also, preferably, black ink compositions and yellow ink compositions use a thioxanthen-based compound as the photosensitizer because their hue is not affected by a color change, and their photopolymerizability is lower compared to ink compositions of other hues.

<Pigment Dispersant>

The photocurable inkjet printing ink composition proposed by the present invention may contain a pigment dispersant as necessary.

For the pigment dispersant, which is used to improve pigment dispersibility and preservation stability of the ink composition proposed by the present invention, any of traditionally used pigment dispersants may be employed without limitation, but use of polymer dispersants is preferred, for example. Such pigment dispersants include carbodiimide-based dispersants, polyester amine-based dispersants, fatty acid amine-based dispersants, modified polyacrylate-based dispersants, modified polyurethane-based dispersants, multi-chain polymer nonionic-based dispersants, polymer ion activators, etc. Any of these pigment dispersants may be used alone, or two or more types may be used in combination.

Preferably the aforementioned pigment dispersant is contained by 1 to 200 parts by mass when the total quantity of pigment used represents 100 parts by mass. If the content of pigment dispersant is lower than 1 part by mass, pigment dispersibility and storage stability of the ink composition proposed by the present invention may drop. In the meantime, while it may be contained by more than 200 parts by mass, doing so may not produce any difference in terms of effects. A more preferred lower limit is 5 parts by mass, while a more preferred upper limit is 60 parts by mass, for the content of pigment dispersant.

<Surfactant>

To improve its discharge stability, preferably the photocurable inkjet printing ink composition proposed by the present invention contains a silicone-based surfactant or other surfactants traditionally used in photocurable inkjet printing ink compositions as a surfactant, according to the inkjet head being used.

Specific examples of silicone-based surfactants include polyether-modified silicone oil, polyester-modified polydimethylsiloxane, polyester-modified methylalkylpolysiloxane, etc. Any of the foregoing may be used alone, or two or more types may be used in combination. For example, BYK-315N and BYK-331, which are leveling agents, may be used.

Preferably the content of surfactant in the ink composition proposed by the present invention is 0.005 to 1.0% by mass. If it is lower than 0.005% by mass, the surface tension of the photocurable inkjet printing ink composition proposed by the present invention will increase and its discharge stability from the inkjet head will drop. If it exceeds 1.0% by mass, on the other hand, more bubbles will generate in the photocurable inkjet printing ink composition, and its discharge stability will drop.

<Additives>

Various types of additives may be added to the photocurable inkjet printing ink composition proposed by the present invention, as necessary, to manifest various functionalities. To be specific, theses additives include polymerization inhibitor, photostabilizer, surface treatment agent, antioxidant, antiaging agent, crosslinking promoter, plasticizer, preservative, pH adjusting agent, defoaming agent, humectant, etc. Also, non-curable resins that function as a vehicle may or may not be compounded. Solvents that should be removed by heating, etc., may or may not be added. Also, it is not necessary to add any metal chelating agent.

The method for preparing the ink composition proposed by the present invention is not limited in any way, and it may be prepared by adding together all of the aforementioned materials and mixing them using a bead mill, three-roll mill, etc.

It should be noted that the ink composition proposed by the present invention may also be prepared by mixing pigment, pigment dispersant, and photopolymerizable components to obtain a concentrated base ink beforehand, and then further adding photopolymerizable components, photopolymerization initiator, as well as surfactant and other additives as necessary, to the concentrated base ink to achieve the desired chemical makeup of photocurable inkjet printing ink composition.

Preferably the base material to be printed with the ink composition proposed by the present invention is a base material constituted by flooring material, vinyl chloride, polyethylene terephthalate, polycarbonate, etc.; however, any base materials traditionally printed with photocurable inkjet printing ink compositions (paper, plastic film, capsule, gel, metal foil, glass, fabric, etc.) can be printed therewith, without problems.

The method for printing and curing the ink composition proposed by the present invention may specifically be a method whereby the ink composition proposed by the present invention is discharged onto a base material from a low-viscosity inkjet nozzle, after which the coating film of the ink composition proposed by the present invention that has landed on the base material is exposed to light and thereby cured.

For example, discharge onto the base material (printing of images) may be implemented by supplying the ink composition proposed by the present invention to a low-viscosity-compatible inkjet nozzle of an inkjet recording printer, and then discharging the ink composition from the inkjet nozzle in such a way that the coating film on the base material will have a film thickness of 1 to 60 μm, for example. Also, exposure to light and curing (curing of images) may be implemented by irradiating light onto the coating film of the ink composition proposed by the present invention that has been applied on the base material as images.

For the inkjet recording printer device with which to print the ink composition proposed by the present invention, any inkjet recording printer device equipped with a low-viscosity inkjet nozzle may be utilized. It should be noted that, if a continuous-type inkjet recording printer device is used, a conductivity-imparting agent is further added to the ink composition proposed by the present invention to adjust its conductivity.

The light source used in the aforementioned curing of the coating film may be ultraviolet ray (UV lamp), ultraviolet ray (light-emitting diode (LED)), electron beam, visible light, etc., where a light-emitting diode (LED) that generates ultraviolet ray with an emission peak wavelength in a range of 350 to 420 nm is preferred from an environmental aspect.

Ultraviolet ray from a light-emitting diode (LED) light source refers to "light irradiated from a light-emitting diode that generates ultraviolet ray with an emission peak wavelength in a range of 350 to 420 nm."

EXAMPLES

The present invention is explained in greater detail below by citing examples, but the present invention is not limited to these examples. It should be noted that, unless otherwise specified, "%" and "part" refer to "% by mass" and "part by mass," respectively.

<Evaluation Methods>
(Viscosity)

The ink compositions obtained in Examples and Comparative Examples were measured for viscosity using an E-type viscometer (product name: RE100L Viscometer, manufactured by Toki Sangyo Co., Ltd.) under the conditions of 25° C. in temperature and 20 rpm in rotor speed.

(Discharge Stability)

An inkjet recording device equipped with an inkjet nozzle for low-viscosity inks, as well as the ink compositions obtained in Examples and Comparative Examples, were let stand for 24 hours in an ambient temperature of 25° C. to bring the temperatures of the inkjet recording device and ink compositions to 25° C. Thereafter, at 25° C., the ink compositions obtained in Examples and Comparative Examples were used to continuously print on PVC80 (manufactured by Lintec Corporation), to evaluate discharge stability according to the evaluation criteria below:

○: Printing is not disturbed, and the ink composition is discharged in a stable manner.
Δ: Printing is slightly disturbed, but the ink composition is discharged in a near-stable manner.
x: Printing is disturbed, or the ink composition is not discharged in a stable manner.

(Tackiness)

An inkjet recording device equipped with an inkjet nozzle for low-viscosity inks, as well as the ink compositions obtained in Examples and Comparative Examples, were let stand for 24 hours in an ambient temperature of 25° C. to bring the temperatures of the inkjet recording device and ink compositions to 25° C. Thereafter, at 25° C., the ink compositions obtained in Examples and Comparative Examples were printed on PVC80 (manufactured by Lintec Corporation), and then cured with an UV-LED lamp manufactured by Phoseon Technology, Inc., to a cumulative UV light quantity of 180 $J/cm^2$, with the distance between the lamp and the ink application surface kept to 2 cm. The surface of the resulting coating film was then touched with a finger and the subsequent state of the coating film was visually evaluated to evaluate tackiness according to the evaluation criteria below:

○: No fingerprint is left on the coating film.
Δ: A slight fingerprint is left on the coating film.
x: A fingerprint is left on the coating film.

(Base Material Adhesion)

The cured coating films of the ink compositions obtained in Examples and Comparative Examples and printed on acrylic sheets (ACRYLITE L/S, manufactured by Mitsubishi Chemical Corporation), were each cross-cut using a cutting knife, after which a cellophane tape (product name: CELLOTAPE (registered trademark), manufactured by Nichiban Co., Ltd.) was stuck to the cut area of and then peeled away, to evaluate the degree of peeling of the cured coating film according to the evaluation criteria below:

○: The peel rate of the cured coating film is 0%.
Δ: The peel rate of the cured coating film is lower than 20%.
x: The peel rate of the cured coating film is 20% or higher.

(Bending Tolerance Property)

The cured coating films of the ink compositions obtained in Examples and Comparative Examples and printed on PET films (E5100, manufactured by Toyobo Co., Ltd.), were each bent by 180 degrees, after which the state of breakage was visually evaluated to evaluate bending tolerance property according to the evaluation criteria below:

○: No breakages such as fine cracks are generated in the coating film.
Δ: Fine cracks are generated in the coating film.
x: Apparent cracks are generated in the coating film.

(Abrasion Resistance)

The cured coating films of the ink compositions obtained in Examples and Comparative Examples and printed on PVC sheets (T938, manufactured by C. I. TAKIRON Corporation), were each rubbed 100 times with a bleached cloth by applying a load of 500 g using a Gakushin-type rubbing tester (manufactured by Daiei Kagaku Seiki MFG. Co., Ltd.), after which the state of the coating film was visually evaluated to evaluate the abrasion resistance according to the evaluation criteria below:

○: The coating film shows no change.
Δ: The coating film has surface scratches.
x: The coating film is apparently removed.

(Solvent Resistance)

The cured coating films of the ink compositions obtained in Examples and Comparative Examples and printed on PVC sheets (T938, manufactured by C. I. TAKIRON Corporation), were each rubbed 10 times with a bleached cloth moistened with ethanol by applying a load of 200 g, using a Gakushin-type rubbing tester (manufactured by Daiei Kagaku Seiki MFG. Co., Ltd.), after which the state of the coating film was visually evaluated to evaluate the solvent resistance according to the evaluation criteria below:

○: The coating film shows no change.
Δ: The coating film has surface scratches.
x: The coating film has apparent removal.

CN371: Oligomer comprising an acrylated amine compound having two photopolymerizable functional groups and two amino groups in the molecule (manufactured by Sartomer Inc.)
TPO: 2,4,6-trimethylbenzoyl-diphenyl-phosphine oxide
DETX: 2,4-diethylthioxanthen-9-one
BYK-315N: Polyester-modified polydimethylsiloxane (manufactured by BYK-Chemie GmbH)
D7110F: PB15: 4 (manufactured by BASF SE)
RGT: PB122 (manufactured by DIC Corporation)
G01: NOVOPERM Yellow 4G01 (manufactured by Clariant AG)
MA7: Carbon black (manufactured by Mitsubishi Chemical Corporation)
SS32000: SOLSPERSE 32000 (manufactured by Lubrizol Japan Ltd.)
PB821: AJISPER PB821 (manufactured by Ajinomoto Fine-Techno Co., Inc.)

TABLE 1A

|  |  | Examples |  |  |  |  |  |  |
|---|---|---|---|---|---|---|---|---|
|  |  | 1 | 2 | 3 | 4 | 5 | 6 | 7 |
| Amine-modified oligomer | CN371 | 4.00 | 4.00 | 4.00 | 4.00 | 4.00 | 4.00 | 4.00 |
| Bifunctional monomers | Polyethylene glycol (200) diacrylate (Tg: 13° C.) | 15.00 | 15.00 | 15.00 | 15.00 |  |  |  |
|  | Polyethylene glycol (400) diacrylate (Tg: −25° C.) |  |  |  |  | 15.00 |  |  |
|  | Ethoxylated (10) bisphenol A diacrylate (Tg: 2° C.) |  |  |  |  |  | 15.00 |  |
|  | EO-modified 1,6-hexanediol diacrylate (Tg: −8° C.) |  |  |  |  |  |  | 15.00 |
|  | Triethylene glycol diacrylate (Tg: 48° C.) |  |  |  |  |  |  |  |
|  | 1,6-hexanediol diacrylate (Tg: 43° C.) |  |  |  |  |  |  |  |
| Monofunctional monomers | 2-(2-ethoxyethoxy)ethyl acrylate (Tg: −54° C.) | 10.06 | 11.74 | 10.90 | 10.26 | 12.06 | 15.06 | 7.06 |
|  | 2-phenoxyethyl acrylate (Tg: 5° C.) | 30.00 | 25.00 | 28.00 | 26.00 | 28.00 | 25.00 | 33.00 |
|  | Isobornyl acrylate (Tg: 88° C.) | 12.00 | 12.00 | 12.00 | 12.00 | 12.00 | 12.00 | 12.00 |
|  | N-vinylcaprolactam (Tg: 125° C.) | 10.00 | 10.00 | 10.00 | 10.00 | 10.00 | 10.00 | 10.00 |
|  | Acryloylmorpholine (Tg: 145° C.) | 8.00 | 8.00 | 8.00 | 8.00 | 8.00 | 8.00 | 8.00 |
| Photopolymerization initiator | TPO | 8.00 | 10.00 | 8.00 | 10.00 | 8.00 | 8.00 | 8.00 |
| Sensitizer | DETX | 0.20 | 0.40 | 0.80 | 2.00 | 0.20 | 0.20 | 0.20 |
| Surfactant | BYK-315N | 0.50 | 0.50 | 0.50 | 0.50 | 0.50 | 0.50 | 0.50 |
| Colorants (pigments) | D7110F | 1.60 |  |  |  | 1.60 | 1.60 | 1.60 |
|  | RGT |  | 2.40 |  |  |  |  |  |
|  | G01 |  |  | 2.00 |  |  |  |  |
|  | MA7 |  |  |  | 1.60 |  |  |  |
| Pigment dispersants | SS32000 | 0.64 | 0.96 | 0.80 |  | 0.64 | 0.64 | 0.64 |
|  | PB821 |  |  |  | 0.64 |  |  |  |
| Total |  |  |  |  | 100.00 |  |  |  |
| Theoretical Tg of copolymer of monofunctional monomers (° C.) |  | 30 | 29 | 29 | 31 | 27 | 24 | 34 |
| All photopolymerizable components |  | 89 | 86 | 88 | 85 | 89 | 89 | 89 |
| EO-modified bifunctional monomer/All photopolymerizable components |  | 17 | 17 | 17 | 18 | 17 | 17 | 17 |
| Monofunctional monomers/All photopolymerizable components |  | 79 | 78 | 78 | 78 | 79 | 79 | 79 |
| Viscosity (mPa · s) |  | 15.0 | 14.8 | 14.9 | 15.1 | 15.0 | 15.3 | 14.8 |
| Discharge stability |  | ○ | ○ | ○ | ○ | ○ | ○ | ○ |
| Tackiness |  | ○ | ○ | ○ | ○ | ○ | ○ | ○ |
| Base material adhesion |  | ○ | ○ | ○ | ○ | ○ | ○ | ○ |

TABLE 1A-continued

|  | Examples | | | | | | |
| --- | --- | --- | --- | --- | --- | --- | --- |
|  | 1 | 2 | 3 | 4 | 5 | 6 | 7 |
| Bending tolerance property | ◯ | ◯ | ◯ | ◯ | ◯ | ◯ | ◯ |
| Abrasion resistance | ◯ | ◯ | ◯ | ◯ | ◯ | ◯ | ◯ |
| Solvent resistance | ◯ | ◯ | ◯ | ◯ | ◯ | ◯ | ◯ |

TABLE 1B

|  |  | Examples | | Comparative Examples | | | | | | |
| --- | --- | --- | --- | --- | --- | --- | --- | --- | --- | --- |
|  |  | 8 | 9 | 1 | 2 | 3 | 4 | 5 | 6 | 7 |
| Amine-modified oligomer | CN371 | 4.00 | 4.00 | 4.00 | 4.00 | 4.00 | 4.00 | 4.00 | 4.00 | 4.00 |
| Bifunctional monomers | Polyethylene glycol (200) diacrylate (Tg: 13° C.) | 7.50 | 29.00 | 2.00 | 15.00 | 15.00 | 40.00 | 34.00 |  |  |
|  | Polyethylene glycol (400) diacrylate (Tg: −25° C.) |  |  |  |  |  |  |  |  |  |
|  | Ethoxylated (10) bisphenol A diacrylate (Tg: 2° C.) |  |  |  |  |  |  |  |  |  |
|  | EO-modified 1,6-hexanediol diacrylate (Tg: −8° C.) |  |  |  |  |  |  |  |  |  |
|  | Triethylene glycol diacrylate (Tg: 48° C.) |  |  |  |  |  |  | 15.00 |  |  |
|  | 1,6-hexanediol diacrylate (Tg: 43° C.) |  |  |  |  |  |  |  |  | 15.00 |
| Monofunctional monomers | 2-(2-ethoxyethoxy)ethyl acrylate (Tg: −54° C.) | 14.56 | 9.06 | 5.06 | 22.06 | 13.06 | 10.06 | 16.06 | 8.06 | 5.06 |
|  | 2-phenoxyethyl acrylate (Tg: 5° C.) | 33.00 | 17.00 | 35.00 | 18.00 | 12.00 | 5.00 | 5.00 | 32.00 | 35.00 |
|  | Isobornyl acrylate (Tg: 88° C.) | 12.00 | 12.00 | 25.00 | 12.00 | 27.00 | 12.00 | 12.00 | 12.00 | 12.00 |
|  | N-vinylcaprolactam (Tg: 125° C.) | 10.00 | 10.00 | 10.00 | 10.00 | 10.00 | 10.00 | 10.00 | 10.00 | 10.00 |
|  | Acryloylmorpholine (Tg: 145° C.) | 8.00 | 8.00 | 8.00 | 8.00 | 8.00 | 8.00 | 8.00 | 8.00 | 8.00 |
| Photopolymerization initiator | TPO | 8.00 | 8.00 | 8.00 | 8.00 | 8.00 | 8.00 | 8.00 | 8.00 | 8.00 |
| Sensitizer | DETX | 0.20 | 0.20 | 0.20 | 0.20 | 0.20 | 0.20 | 0.20 | 0.20 | 0.20 |
| Surfactant | BYK-315N | 0.50 | 0.50 | 0.50 | 0.50 | 0.50 | 0.50 | 0.50 | 0.50 | 0.50 |
| Colorants (pigments) | D7110F | 1.60 | 1.60 | 1.60 | 1.60 | 1.60 | 1.60 | 1.60 | 1.60 | 1.60 |
|  | RGT |  |  |  |  |  |  |  |  |  |
|  | G01 |  |  |  |  |  |  |  |  |  |
|  | MA7 |  |  |  |  |  |  |  |  |  |
| Pigment dispersants | SS32000 | 0.64 | 0.64 | 0.64 | 0.64 | 0.64 | 0.64 | 0.64 | 0.64 | 0.64 |
|  | PB821 |  |  |  |  |  |  |  |  |  |
| Total |  |  |  |  |  | 100.00 |  |  |  |  |
| Theoretical Tg of copolymer of monofunctional monomers (° C.) |  | 22 | 38 | 43 | 15 | 43 | 46 | 29 | 32 | 36 |
| All photopolymerizable components |  | 89 | 89 | 89 | 89 | 89 | 89 | 89 | 89 | 89 |
| EO-modified bifunctional monomer/All photopolymerizable components |  | 8 | 33 | 2 | 17 | 17 | 45 | 38 | 17 | 17 |
| Monofunctional monomers/All photopolymerizable components |  | 87 | 63 | 93 | 79 | 79 | 51 | 57 | 79 | 79 |
| Viscosity (mPa · s) |  | 14.9 | 15.2 | 15.1 | 14.5 | 14.8 | 16.0 | 15.8 | 14.0 | 13.5 |
| Discharge stability |  | ◯ | ◯ | ◯ | ◯ | ◯ | ◯ | ◯ | ◯ | ◯ |
| Tackiness |  | ◯ | ◯ | ◯ | X | ◯ | ◯ | ◯ | ◯ | ◯ |
| Base material adhesion |  | ◯ | Δ | ◯ | ◯ | ◯ | X | X | Δ | Δ |
| Bending tolerance property |  | Δ | Δ | Δ | ◯ | X | Δ | Δ | X | X |
| Abrasion resistance |  | Δ | ◯ | X | ◯ | ◯ | ◯ | ◯ | ◯ | ◯ |
| Solvent resistance |  | Δ | ◯ | X | Δ | ◯ | ◯ | ◯ | ◯ | ◯ |

The Examples representing examples that conform to the present invention proved excellent in discharge stability of ink composition as well as in tackiness, base material adhesion, bending tolerance property, abrasion resistance, and solvent resistance of coating film.

By contrast, Comparative Example 1 where the content of ethylene oxide-modified bifunctional monomer was low and the Tg of the copolymer obtained from monofunctional monomers was high, resulted in poor bending tolerance property, abrasion resistance, and solvent resistance.

Comparative Example 2 where the Tg of the copolymer obtained from monofunctional monomers was low, resulted in poor tackiness and solvent resistance.

Comparative Example 3 where the Tg of the copolymer obtained from monofunctional monomers was high, resulted in poor bending tolerance property.

Comparative Example 4 where the content of ethylene oxide-modified bifunctional monomer was high and the Tg of the copolymer obtained from monofunctional monomers was high, resulted in poor base material adhesion and bending tolerance property.

Comparative Example 5 where the content of ethylene oxide-modified bifunctional monomer was within the range specified by the present invention but the content of monofunctional monomers was low, resulted in poor base material adhesion and bending tolerance property.

Comparative Example 6 where the Tg of ethylene oxide-modified bifunctional monomer was high, resulted in poor base material adhesion and bending tolerance property.

Comparative Example 7 where no ethylene oxide-modified bifunctional monomer was contained and 1,6-hexanediol diacrylate was contained, resulted in poor base material adhesion and bending tolerance property.

What is claimed:

1. A photocurable inkjet printing ink composition that contains a colorant, photopolymerizable components comprising an amine-modified oligomer, an ethylene oxide-modified bifunctional monomer, and an monofunctional monomer, and photopolymerization initiator, and satisfies all of conditions (1) to (3) below:
   (1) the ethylene oxide-modified bifunctional monomer is contained by 5.0 to 40.0% by mass, and the monofunctional monomers are contained by 60.0% by mass or more, relative to all photopolymerizable components;
   (2) a theoretical Tg of the ethylene oxide-modified bifunctional monomer is 20° C. or lower; and
   (3) a theoretical Tg of a copolymer of solely the monofunctional monomers is 20 to 40° C.,
   wherein the photocurable inkjet printing ink composition contains the amine-modified oligomer by 2.0 to 10.0% by mass relative to all photopolymerizable components.

2. The photocurable inkjet printing ink composition according to claim 1, wherein a content of the ethylene oxide-modified bifunctional monomer is 10.0 to 30.0% by mass relative to all photopolymerizable components.

3. The photocurable inkjet printing ink composition according to claim 1, wherein the ethylene oxide-modified bifunctional monomer contains at least one of polyethylene glycol (200) diacrylate, polyethylene glycol (400) diacrylate, ethoxylated (10) bisphenol A diacrylate, and EO-modified 1,6-hexanediol diacrylate.

4. The photocurable inkjet printing ink composition according to claim 2, wherein the ethylene oxide-modified bifunctional monomer contains at least one of polyethylene glycol (200) diacrylate, polyethylene glycol (400) diacrylate, ethoxylated (10) bisphenol A diacrylate, and EO-modified 1,6-hexanediol diacrylate.

* * * * *